Sept. 17, 1968 T. J. CHRISTOPHER 3,402,320
TELEVISION DEFLECTION CIRCUIT
Filed Dec. 5, 1966
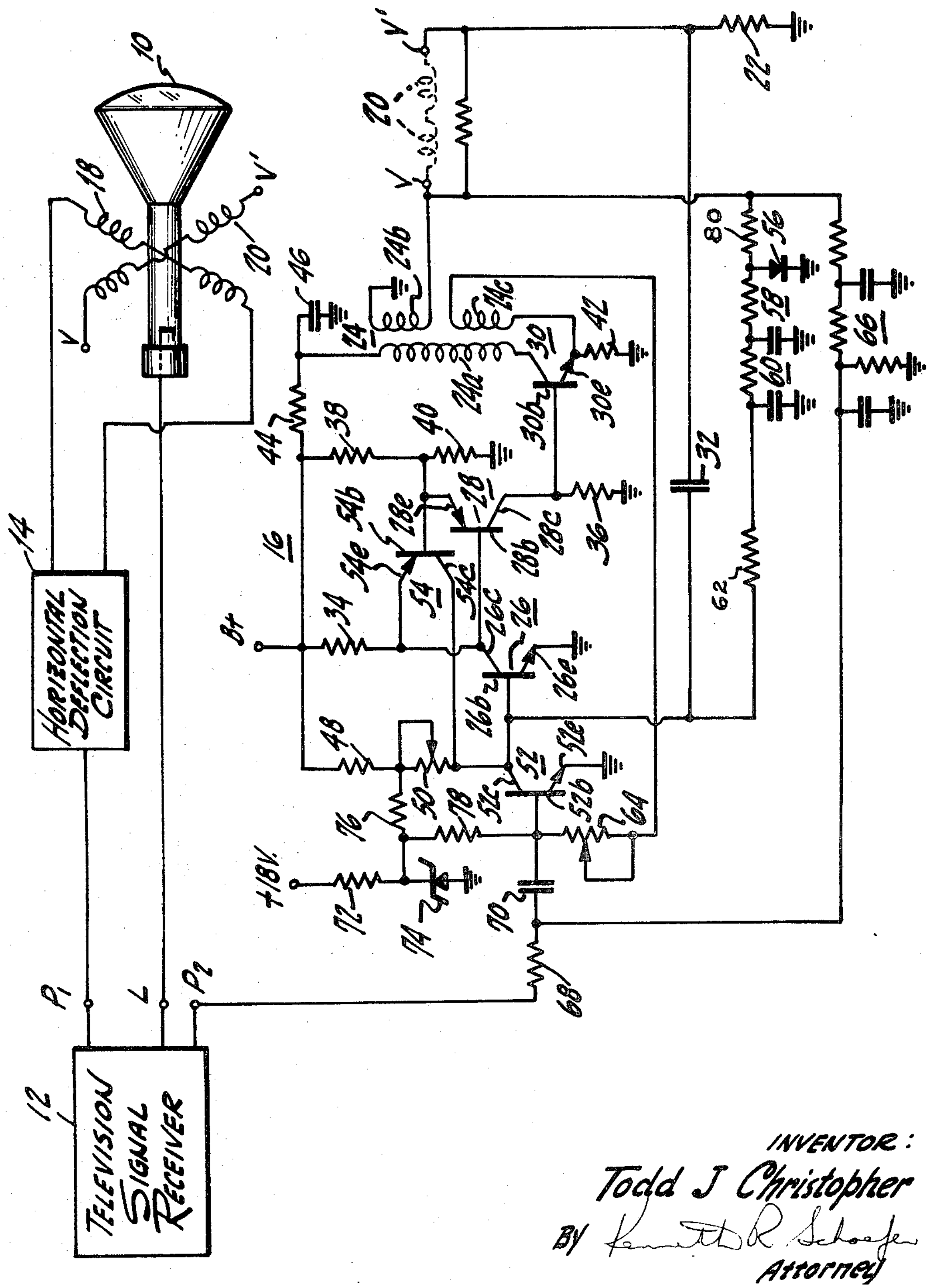
INVENTOR:
Todd J Christopher
BY Kenneth R. Schaefer
Attorney United States Patent Office 3,402,320

Patented Sept. 17, 1968

3,402,320
TELEVISION DEFLECTION CIRCUIT

Todd J. Christopher, Indianapolis, Ind., assignor to Radio Corporation of America, a corporation of Delaware Filed Dec. 5, 1966, Ser. No. 599,083
16 Claims. (Cl. 315—27)

This invention relates to electromagnetic cathode ray beam deflection circuits of the type employed in television receivers and, in particular, to transistor vertical deflection circuits including apparatus for substantially improving the vertical linearity of the scanning raster produced on an associated cathode ray tube.

One type of transistor vertical deflection circuit utilizes the principles of the "Miller Integrator" to generate a substantially sawtooth shaped current for application to the vertical deflection winding associated with a cathode ray tube. In such circuits, the vertical deflection winding is traversed by a desired current waveform in response to the generation of a sawtooth voltage waveform across a capacitor, the capacitor being coupled in a negative feedback path associated with a high gain transistor amplifier. A switching device is coupled in circuit with and is utilized to discharge the capacitor at a predetermined time in the deflection cycle to initiate the retrace portion of such cycle. The deflection circuit may be rendered self-oscillating by supplying to the switching device a retrace voltage pulse which is developed when the current supplied to the vertical deflection windings is decreased. The deflection cycles are synchronized by means of vertical synchronizing signals received by the television receiver along with the image representative information.

In such circuits, a finite voltage is required to initiate conduction in the amplifier and thereby to commence production of the desired sawtooth deflection waveform across the deflection windings. In the absence of means for providing such a voltage immediately at the beginning of vertical trace, the image produced upon the cathode ray tube is noticeably and undesirably cramped at the top.

Furthermore, the "Miller Integrator" provides an essentially linear output waveform which must be modified when utilized in connection with a cathode ray tube having a wide deflection angle (i.e. S-shaping of the deflection waveform is required to produce a linear vertical raster).

In accordance with the present invention, the desired vertical linearity is achieved by providing an auxiliary means for charging the sawtooth capacitor at the end of the retrace portion of the deflection cycle. The auxiliary charging means is connected to charge the capacitor at a rate substantially in excess of that employed during trace to a voltage sufficient to turn on the associated transistor amplifier at the beginning of trace thereby eliminating cramping of the top of the image. Furthermore, the voltage waveform produced across the deflection windings is coupled to a clipping and integrating circuit which provides a correction to the input of the amplifier to achieve the desired S-shaping of the output current waveform during trace.

The novel features that are considered characteristic of this invention are set forth with particularity in the appended claims. The invention itself, however, both as to its organization and method of operation as well as additional objects thereof, will best be understood from the following description when read in connection with the accompanying drawing.

In the drawing, the circuits of a television receiver serving to provide signals for energizing an image reproducing device such as a kinescope 10 are represented by a single block 12 labelled "Television Signal Receiver." The receiver unit 12 incorporates the usual elements required to provide video signals at output terminal L for appropriate intensity modulation of the electron beam of kinescope 10, as well as to provide suitable synchronizing pulse information at terminals $P_1$ and $P_2$ to synchronize, in respective horizontal and vertical deflection circuits 14 and 16, the energization of the respective horizontal and vertical windings 18 and 20 of a deflection yoke associated with kinescope 10.

In the vertical deflection circuit shown in the drawing, a sawtooth curent waveformr is caused to pass through the vertical deflection windings 20 of the deflection yoke, the windings 20 being coupled in series with a current sampling resistor 22 across the secondary winding **24*b* of a vertical deflection output transformer 24. The flow of the desired saw-tooth current waveform in the windings 20, which appear essentially resistive during the relatively low frequency trace portion of the television vertical deflection cycle, is produced in response to the development during trace of a sawtooth voltage waveform across the primary winding 24*a* of output transformer 24. As will be noted below, during the relatively rapid (higher frequency) retrace portion of the vertical cycle, the deflection windings 20 are substantially inductive and the retrace voltage waveform across windings 20 is an approximately triangular pulse. The development of the composite recurring pulse-sawtooth voltage waveform across transformer 24** is accomplished in the illustrated embodiment of the invention through use of a transistorized arrangement employing principles of the "Miller Integrator."

The integrator comprises transistors 26, 28 and 30 which are cascaded to form a high gain amplifier. Negative feedback is established between the amplifier output and amplifier input via a path incorporating a capacitor 32.

Amplifier 26 comprises an N-P-N transistor having a base electrode **26*b*, a collector electrode 26*c* and an emitter electrode 26*e*. The emitter electrode 26*e* of amplifier 26 is connected to ground potential while the collector electrode 26*c* is supplied with operating potential from the B+ voltage supply via a resistor 34. The collector electrode 26*c* is directly connected to the base electrode 28*b* of amplifier 28 (a P-N-P transistor). The collector electrode 28*c* of amplifier 28 is coupled to ground by means of a collector load resistor 36 while the emitter electrode 28*e* is coupled to the junction of resistors 38 and 40 which form a voltage divider across the B+ voltage supply. The collector electrode 28*c* is directly coupled to the base electrode 30*b* of output amplifier 30 (an N-P-N transistor). The emitter electrode 30*e* of amplifier 30 is coupled to ground by means of a relatively small "starting" resistor 42 while operating voltage is supplied from the B+ supply to collector electrode 30*c* by means of primary winding 24*a* and a de-coupling network comprising resistor 44 and capacitor 46**.

Capacitor 32 is subject to alternate charging and discharging to produce the desired recurring sawtooth waveform, the main charging occurring during trace via a path comprising the B+ voltage supply (e.g. +65 volts), a resistor 48, a variable resistor height control 50 and current sampling resistor 22, and the discharging occurring during retrace via a vertical oscillator stage 52 and sampling resistor 22. The charging supply may be compensated for changes in image brightness by coupling the junction of resistors 48 and 50 to the brightness control (not shown) provided in the receiver. Furthermore, a stabilized voltage supply comprising the series combination of a resistor 72 and a Zener diode 74 coupled across a low voltage source (e.g. +18 volts) is coupled to the junction of resistors 48 and 50 by means of a resistor 76 to prevent image size changes in the event the B+ supply voltage is subject to variations.

In accordance with one aspect of the present invention, an auxiliary means for charging capacitor 32 before the commencement of vertical trace comprises a transistor 54 having a base electrode 54*b*, a collector electrode 54*c* and an emitter electrode 54*e*, the emitter 54*e* and collector 54*c* being coupled by means of the resistors 34 and 22 in circuit with the B+ voltage supply and the capacitor 32. The voltage divider comprising resistors 40 and 38 provides a bias voltage for the base electrode 54*b* of transistor 54 and, at the same time, provides the supply voltage for the emitter electrode 28*e* of amplifier 28.

Furthermore, an S-shaping network comprising a resistor 80, a clipping diode 56, a first R–C integrator 58, a second R–C integrator 60 and a coupling resistor 62 is coupled between deflection winding 20 and the input (base electrode 26*b*) of amplifier 26.

Three additional feedback paths are provided between output amplifier 30 and oscillator 52 to render the deflection circuit self-oscillating. Specifically, an integrating network 66 is coupled between deflection winding 20 and base electrode 52*b* by means of a capacitor 70 to provide a trigger impulse to base electrode 52*b* of oscillator 52 periodically to turn oscillator 52 on to initiate retrace and off to permit the occurrence of trace. A feedback winding 24*c* associated with output transformer 24 is coupled via a variable resistor hold control 64 to base electrode 52*b* to provide, in conjunction with the capacitor 70, a waveform to increase the rate at which the input to base 52*b* changes near the end of trace, thereby improving the frequency stability and noise immunity of the system. Finally, the voltage produced across resistor 42 (approximately 1 ohm) is coupled via winding 24*c* and hold control 64 to the base electrode 52*b* to provide feedback to insure initiation of oscillation when the receiver is first turned on.

The operation of oscillator stage 52 is synchronized with respect to the image-representative portions of the received television signal by means of vertical synchronizing pulses applied from terminal $P_2$ via resistor 68 and capacitor 70 to base 52*b*.

A stabilized base bias voltage is provided for oscillator stage 52 from Zener diode 74 by means of a resistor 78.

The operation of the vertical deflection circuit now will be described. Vertical oscillator stage 52 is operated on a recurrent basis alternately to connect capacitor 32 to a substantially constant current charging supply and then to disconnect such supply and effect discharging of capacitor 32.

During the trace portion of each vertical deflection cycle, oscillator stage 52 and transistor 54 are maintained in a non-conductive state while the transistors 26, 28 and 30 in the high gain amplifier are all biased for conduction. A charging circuit for capacitor 32 is established between the B+ terminal (or, more specifically between the compensating supply point at the junction of resistor 48 and height control 50) and ground. The charging circuit comprises the series combination of height control 50, capacitor 32 and current sampling resistor 22 (neglecting the windings 20 and 24*b* in parallel with resistor 22). The charging circuit provides a substantially constant current at the junction of capacitor 32 and base electrode 26*b*. That is, the voltage at the junction of resistor 48 and height control 50 remains substantially constant by virtue of the operation of Zener diode 74 and the voltage at the base 26*b* of transistor 26 remains substantially constant (e.g. 0.7 volt) while transistor 26 is conductive. The resultant constant voltage across height control 50 provides the desired constant charging current for producing a linearly increasing voltage during trace across capacitor 32. At the same time, the current sampling resistor 22 provides a reference voltage across capacitor 32, which voltage is representative of the current in deflection windings 20. Neglecting for the moment the S-shaping network 54–62, if the voltage across resistor 22 (and the current in windings 20) varies linearly, the constant current supply (height control 50) provides the necessary constant current to permit the voltage across capacitor 32 to increase linearly and thereby follow the voltage across resistor 22. However, if the current in windings 20 varies from the desired linear waveform and the voltage across resistor 22 varies in a like manner, the current required for capacitor 32 to follow the voltage across resistor 22 will change. Since a substantially constant current is supplied to the junction of capacitor 32 and base 26*b*, the difference in the current demanded by capacitor 32 will be supplied to the base electrode 26*b* of transistor 26. This relatively small "error" current then will be amplified in transistors 26, 28 and 30 to provide the required correction to the current supplied to windings 20 to maintain a linear trace current waveform. The gain (amplification) provided by transistors 26, 28 and 30 is selected sufficiently high so that a relatively small variation from the desired output waveform will produce the necessary correction.

The characteristic of the Miller integrator whereby only a very small variation at the amplifier input is required to effect a significant change at the output is applied advantageously in the operation of the S-shaping network. Specifically, an essentially parabolic current waveform is supplied to the input (base electrode 26*b*) of the high gain amplifier by means of the components 54–62 to modify the linear current waveform in deflection windings 20. In practice, therefore, the voltage across resistor 22 is S-shaped rather than linear where a wide deflection angle kinescope 10 is employed. The required parabolic current waveform is derived by double integration (in networks 58 and 60) of a portion of the voltage waveform appearing across transformer winding 24*b*. That waveform which is made up of an S-shaped trace portion and a relatively large triangular pulse retrace portion, if passed through the networks 58 and 60 would not, because of the presence of the retrace pulse, produce the desired "parabolic" waveform. Therefore, the clipping diode 56 is provided to remove a substantial portion of the undesired retrace pulse.

Near the end of the trace portion of each deflection cycle, the voltage at the base 52*b* of oscillator stage 52 approaches the required turn-on level. The retrace portion of each deflection cycle is initiated when a vertical synchronizing pulse is applied to oscillator stage 52 to drive stage 52 into conduction. The base 26*b* of transistor 26 then is driven below the voltage required to maintain conduction in transistor 26 and all of the transistors 26, 28 and 30 are driven to cutoff. The current in deflection windings 20 then begins to decrease and, at the same time, a voltage pulse is produced across windings 20 as was mentioned above. When oscillator stage 52 conducts, a discharging circuit is completed for capacitor 32 comprising, in series, oscillator stage 52, capacitor 32 and resistor 22. Furthermore, as transistor 26 is driven to cutoff, transistor 54 is driven into conduction and, initially, the emitter-collector current thereof passes through oscillator stage 52. Capacitor 32 discharges relatively rapidly through oscillator stage 52 essentially to zero voltage. The peak voltage pulse produced across deflection windings 20 begins to decline and, at a somewhat later instant determined by the time constant of integrator network 66, the voltage applied to base 52*b* also declines. Oscillator stage 52 is then driven towards cutoff. At that time, transistor 54, the current from which previously had been passing through oscillator stage 52, supplies charging current to capacitor 32. Capacitor 32 is charged rapidly by this current to a voltage of a polarity to initiate conduction in transistor 26. When the base-emitter voltage of transistor 26 reaches the nominal turn-on voltage (e.g., +0.7 volt), the transistors 26, 28 and 30 all are driven into conduction whereupon transistor 54 is driven to cutoff. The next trace cycle then commences.

It should be noted that while it is common practice in television receiver design to provide an adjustable vertical linearity control in a vertical deflection circuit, in the illustrated embodiment of the invention there is no need for such a control. The basic Miller integrator enhanced by the auxiliary charging circuit constructed in accordance with the present invention provides an exceptionally linear deflection current waveform.

While the invention has been described in terms of a preferred embodiment, other configurations are also encompassed within the scope of the invention. For example, arrangements of transistors having different types of conductivity and utilizing different amplifying techniques than those shown in the drawing also may be used.

What is claimed is:

1. In a television receiver, a vertical deflection circuit comprising amplifying means having an input terminal and an output terminal, vertical deflection windings coupled to said output terminal, a capacitor coupled to said amplifier input terminal, a primary current supply coupled to said capacitor for charging said capacitor during the trace portion of each deflection cycle.

discharging means coupled to said capacitor for periodically decoupling said current supply from said capacitor and for rapidly discharging said capacitor, and auxiliary charging means coupled to said capacitor for periodically recharging said capacitor rapidly to provide sufficient voltage at said input terminal of said amplifying means to initiate conduction in said amplifying means substantially at the commencement of the trace portion of each vertical deflection cycle.

2. In a television receiver, a vertical deflection circuit according to claim 1 and further comprising means for rendering said auxiliary charging means operative during the retrace portion of each deflection cycle to provide rapid recharging of said capacitor during said retrace portion.

3. In a television receiver, a vertical deflection circuit according to claim 1 wherein said amplifying means comprises at least a first transistor requiring a predetermined input voltage to initiate conduction in said transistor, and said auxiliary charging means providing sufficient current to charge said capacitor and thereby provide said predetermined input voltage at the commencement of the trace portion of each vertical deflection cycle.

4. In a television receiver, a vertical deflection circuit according to claim 3 wherein said auxiliary charging means comprises at least a second transistor coupled to said capacitor and to said discharging means, said second transistor being rendered conductive during the retrace portion of each deflection cycle.

5. In a television receiver, a vertical deflection circuit according to claim 4 and further comprising means for coupling said second transistor to said first transistor in such a manner that said first transistor is conductive when said second transistor is non-conductive and said second transistor is conductive when said first transistor is non-conductive.

6. In a television receiver, a vertical deflection circuit according to claim 5 wherein said discharging means comprises a third transistor coupled across said capacitor, said deflection circuit further comprising means for rendering said third transistor conductive during the retrace portion and non-conductive during the trace portion of each vertical deflection cycle.

7. In a television receiver, a vertical deflection circuit comprising an amplifier having an input circuit including a current supply and an output circuit including means for sampling an output waveform in said output circuit, a negative feedback path including a capacitor coupled between said input circuit and said sampling means, periodically operable means for decoupling said current supply from and for coupling said current supply with said input circuit to effect relatively rapid discharging and slow charging of said capacitor, and auxiliary charging means for rapidly charging said capacitor immediately prior to initiation of said relatively slow charging.

8. In a television receiver, a vertical deflection circuit according to claim 7 wherein said sampling means comprises a resistor coupled to said output circuit for providing a voltage at said capacitor representative of current in said output circuit.

9. In a television receiver, a vertical deflection circuit according to claim 7 wherein said amplifier means comprises at least a first transistor requiring a predetermined input voltage to initiate conduction in said first transistor, and said auxiliary charging means is arranged to provide sufficient current to said capacitor to provide said predetermined input voltage prior to initiation of said slow charging.

10. In a television receiver, a vertical deflection circuit according to claim 9 wherein said auxiliary charging means comprises a source of voltage and at least a second transistor coupled in a series circuit with said periodically operable means and in a separate series circuit with said capacitor.

11. In a television receiver, a vertical deflection circuit according to claim 10 wherein said periodically operable means comprises at least a third transistor coupled across said capacitor and means for rendering said third transistor conductive during the retrace portion and non-conductive during the trace portion of each vertical deflection cycle.

12. In a television receiver, a vertical deflection circuit according to claim 11 and further comprising means for coupling said second transistor to said amplifier such that said amplifier is conductive when said second transistor is non-conductive and said second transistor is conductive when said amplifier is non-conductive.

13. In a television receiver, a vertical deflection circuit according to claim 12 wherein said first and third transistors are of like type conductivity and said second transistor is of opposite type conductivity with respect thereto.

14. In a television receiver, a vertical deflection circuit according to claim 13 wherein each of said first, second and third transistors include base, emitter and collector electrodes, the collector electrodes of said second and third transistors being connected together and the emitter electrode of said second transistor being connected to the collector electrode of said first transistor.

15. In a television receiver a vertical deflection circuit comprising amplifying means having an input terminal and an output terminal, vertical deflection windings coupled to said output terminal, sampling means coupled to said windings for providing a voltage representative of the current through said windings during the trace portion of each vertical deflection cycle, negative feedback means including a capacitor coupled between said sampling means and said amplifier input terminal, a primary current supply coupled to said capacitor for charging said capacitor during the trace portion of each deflection cycle, discharging means coupled to said capacitor for periodically decoupling said current supply from said capacitor and for rapidly discharging said capacitor, and waveform shaping means coupled across said deflection windings for providing correction to the input of said amplifier to effect S-shaping, said shaping means comprising a unidirectionally conductive diode poled to conduct during the retrace portion of each vertical deflection cycle and at least one resistor-capacitor network coupled across said diode.

16. In a television receiver, a vertical deflection circuit according to claim 15 and further comprising a second resistor-capacitor integration network coupled across said capacitor of said first network.

References Cited

UNITED STATES PATENTS

| | | | |
|---|---|---|---|
| 3,257,578 | 6/1966 | Daute | 315—27 |
| 3,273,007 | 9/1966 | Schneider | 315—27 |

RODNEY D. BENNETT, *Primary Examiner.*

C. L. WHITHAM, *Assistant Examiner.*